United States Patent

[11] 3,628,657

[72] Inventor  Ronald J. Billett
               Sunnyvale, Calif.
[21] Appl. No. 752,857
[22] Filed     Aug. 15, 1968
[45] Patented  Dec. 21, 1971
[73] Assignee  FMC Corporation
               San Jose, Calif.

[54] METHOD OF AND APPARATUS FOR DETECTING AN OPAQUE OBJECT IN A TRANSLUCENT SUBSTANCE
     19 Claims, 5 Drawing Figs.

[52] U.S. Cl. .................................... 209/111.7,
                                          250/223, 356/167
[51] Int. Cl. .......................................... B07c 5/342
[50] Field of Search ............................. 331/94.5;
          356/167, 173, 195, 205; 209/111.6, 111.7;
                                              250/223, 230

[56] References Cited
     UNITED STATES PATENTS

| | | | |
|---|---|---|---|
| 2,922,894 | 1/1960 | Kerr | 250/230 X |
| 3,005,549 | 10/1961 | Flanders | 209/111.6 |
| 3,302,786 | 2/1967 | Conrad | 209/111.7 |

*Primary Examiner*—Richard A. Schacher
*Attorneys*—F. W. Anderson and C. E. Tripp ABSTRACT: The apparatus of the present invention serves to detect a pit or a pit fragment that may remain in a peach half because of an imperfect pit removing operation. Toward this end, a conventional gas laser casts continuously a beam of laser light on a conventional oscillating mirror. In turn, the oscillating mirror, which is located on one side of an advancing peach half, projects an oscillating pencil of laser light through the advancing peach half. On the other side of the advancing peach half and disposed in the path of travel of the oscillating pencil of laser light is a suitable light sensing device. A conventional light diffusing screen intercepts the oscillating pencil of laser light in the absence of a peach half.

While no peach half is in the path of travel of the oscillating pencil of laser light, the diffusing screen diffuses the oscillating pencil of laser light, the intensity of which is sufficient to cause the light sensing device to produce a no reject signal in the output thereof. When a peach half with no pit or pit fragment therein advances through the oscillating pencil of laser light, it diffuses the oscillating pencil of laser light. As a consequence thereof, a no reject signal is produced in the output of the light sensing device. Should a pit or a pit fragment be present in the advancing peach half, then the oscillating pencil of laser light is partially blocked or intercepted by the opaque characteristics of a pit or pit fragment, which causes a reduction of the intensity of the light impinging on the light sensitive device. This action results in a reject signal being produced in the output of the light sensing device.

INVENTOR.
RONALD J. BILLETT
BY F. W. Anderson
C. E. Tripp
ATTORNEYS

INVENTOR
RONALD J. BILLETT

BY F. W. Anderson
C. E. Tripp

ATTORNEYS

INVENTOR.
RONALD J. BILLETT

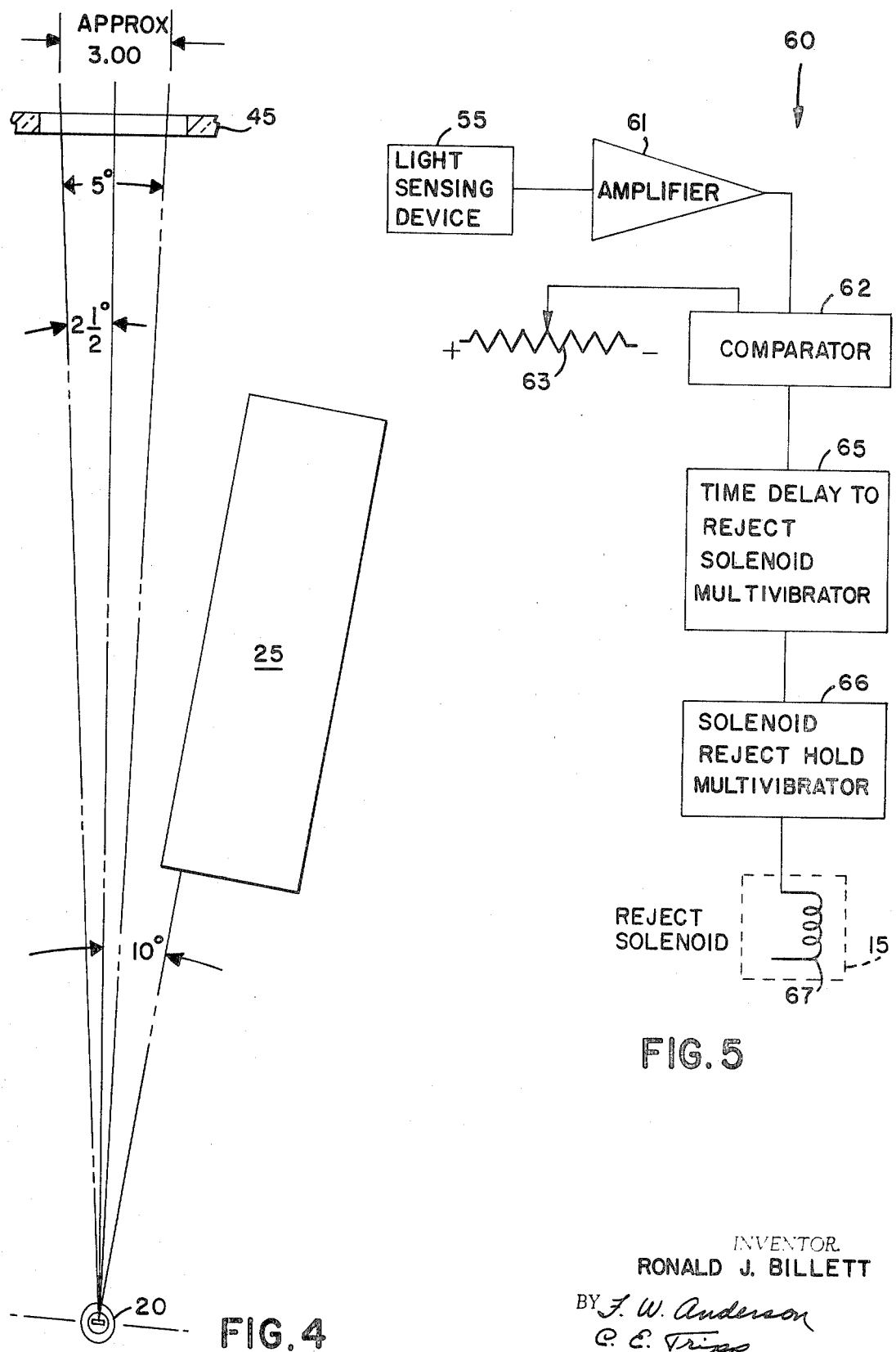

METHOD OF AND APPARATUS FOR DETECTING AN OPAQUE OBJECT IN A TRANSLUCENT SUBSTANCE

BACKGROUND OF THE INVENTION

The present invention relates to a method of and apparatus for detecting the presence of an opaque object in a translucent, comestible substance.

In a typical process of preparing peaches for canning, the peaches are cut in half and the pits are removed from the peach halves. The peach halves are subsequently inspected for pits or pit fragments that may remain therein.

Heretofore, apparatus for inspecting peach halves for the presence of a pit or a pit fragment have employed a source of conventional white light disposed on one side of the peach half and a light sensitive device disposed on the other side of the peach half which in some cases viewed the peach through a small scanned aperture. The intensity of the light passing through the peach half was varied by the presence or absence of a pit or a pit fragment. When a pit or pit fragment was present in the peach half, the light sensitive device produced a reject signal in the output thereof and when a pit or a pit fragment was not detected, the light sensitive device produced a no reject signal in the output thereof. Suitable apparatus were connected to the output of the light sensitive device for separating peach halves with a pit or pit fragment therein from peach halves without a pit or a pit fragment therein. However the level of light reaching the sensor was reduced as much by a dense green peach as by a ripe peach with a small pit fragment leading to inaccuracies of operation over a wide range of fruit densities.

In a patent application by Paul E. Seaborn, Ser. No. 659,906, filed on Aug. 11, 1967, for Method For Detecting Object in Translucent Substance and Device Therefor, there is described an improved device for detecting pit fragments in peaches by reducing the occurrence of false signals wherein a light source directs parallel rays of light toward peach halves to obviate problems of pit fragment detecting arising out of differences in density, color, size and skin irregularities in various peaches. The assignee of the present application is also the assignee of the above-cited application. This device, however, uses a multiplicity of detectors each of which scans an area related to the size of the detector. Thus, the resolution (or minimum pit fragment discernible) is limited by the number and size of the detectors.

The use of a narrow beam that is scanned across the object can significantly increase the ability to discover small fragments.

Therefore it is desirable to find means of utilizing an intense, rapidly oscillatable, well collimated light beam.

In addition, simplicity and therefore reliability have been further improved in the present invention by reducing sharp contrasts in light as the peaches successively enter and leave the inspection zone.

SUMMARY OF THE INVENTION

In the method and device of the present invention for detecting an opaque object in a translucent substance, the accuracy with which objects can be located within successive substances is increased by casting a narrow pencil of light on the translucent substance advancing through the inspection zone. A narrow pencil of light enables the use of a small mirror. The low mass of a small mirror permits it to be oscillated at a high enough rate so as to enable the translucent substances advancing successively and continuously at high speeds to be completely searched by the illuminating beam. It is a laser beam that produces the narrow pencil of light so as to make possible the employment of a small mirror. In the case of peach pit fragments, the fragment may be located at varying depths within the empty pit cavity. Therefore, for consistent accuracy the searching beam should be a parallel narrow beam rather than one that is focused to a spot since the apparent spot size will change as the fragment location changes introducing a sensitivity change. It is also desirable to use an intense source of light to reduce the susceptibility to external interference since openings must exist to permit objects to enter and leave the observation chamber. The laser satisfies these additional requirements.

For reducing sharp contrasts in light sensed from the translucent substance entering and leaving the inspection zone and to protect the sensor from the undesirable effects of being subjected to an intense energy spot, a diffusing screen is employed. When a peach half without a pit or pit fragment therein advances through the inspection zone, the glow from the peach half is detected by a light sensing device. While no peach is advancing through the inspection zone, the glow from the diffusing screen is detected by the same light sensing device. As previously described, the beam is caused to oscillate across the screen by an oscillating, single mirror face. This firstly eliminates any changes in intensity due to using multiple mirror facets and, secondly, eliminates the need to gate the photosensor at the extremities of the scanning path since light is always present on the screen. It is to be observed that when the peach occupies only a portion of the scan line the rest appears on the screen causing a continuous input to the sensor. Should a pit or pit fragment be in the peach half advancing through the inspection zone, the change in glow from the opaque characteristics of the pit or pit fragment causes a sharp reduction of the intensity of the light impinging on the light sensing device to cause a reject signal to be produced in the output of the light sensing device.

Accordingly, it is an object of the present invention to provide a method and apparatus for detecting an opaque object in a translucent substance at high rates of speed of successive translucent substances.

Another object of the present invention is to provide apparatus for detecting opaque objects at varying depths within a translucent substance with consistent results.

Another object is to provide a method of dynamic scanning that eliminates the need for scan control devices and circuitry and gives a high illumination intensity which can be received by a single photosensor regardless of the scan position.

BRIEF DESCRIPTION OF THE DRAWINGS

FIG. 4 is a diagrammatic illustration of the oscillating laser light beam projecting devices employed in the apparatus shown in FIGS. 1–3.

FIG. 5 is a schematic diagram of the electrical circuits employed in the apparatus illustrated in FIGS. 1–4.

DESCRIPTION OF THE PREFERRED EMBODIMENT

Figure 1:
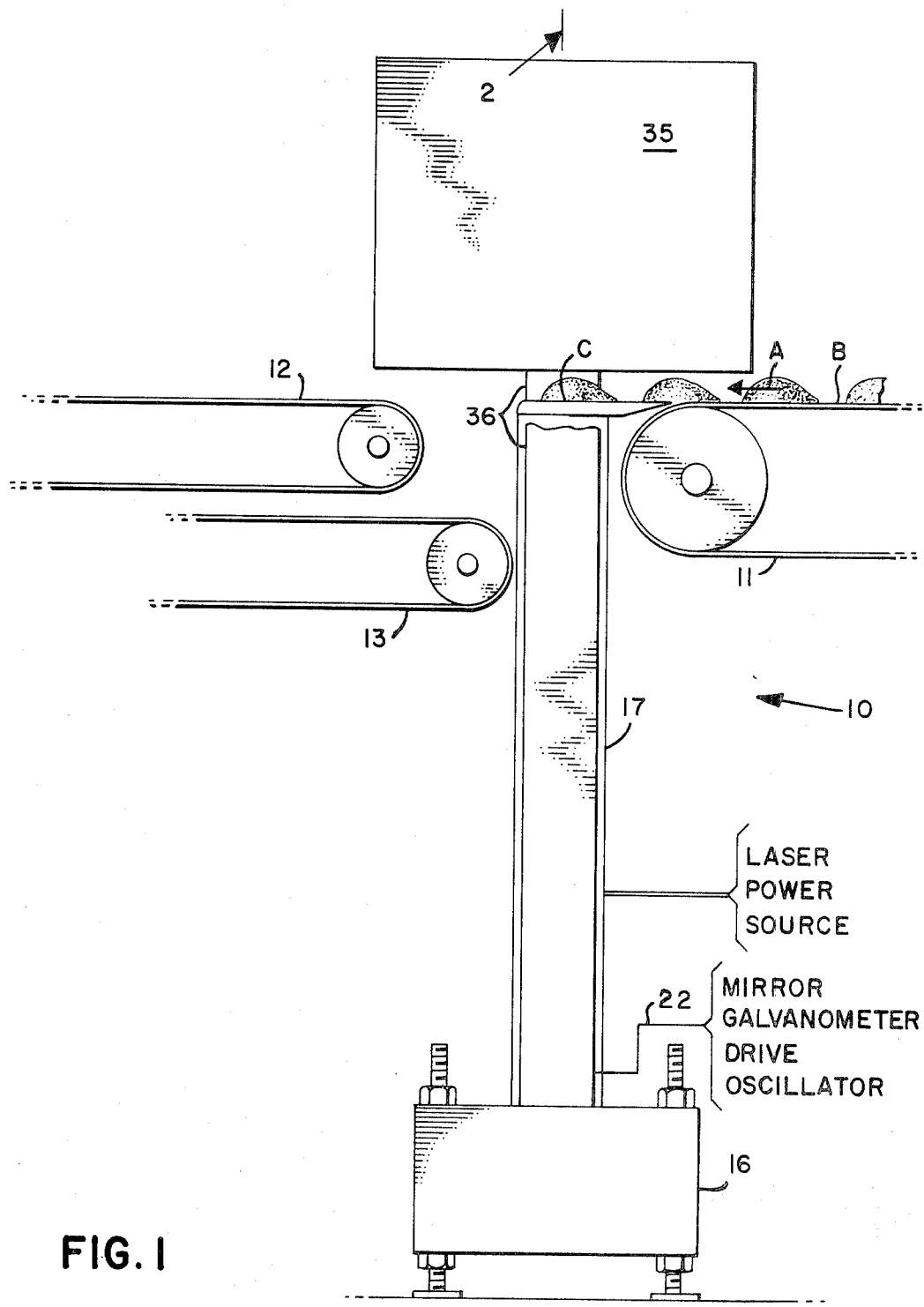
FIG. 1 is an elevational view of the apparatus of the present invention for detecting pits or pit fragments in peach halves shown with suitable conveyors for advancing pit halves to and from the inspection zone.
Figure 2:
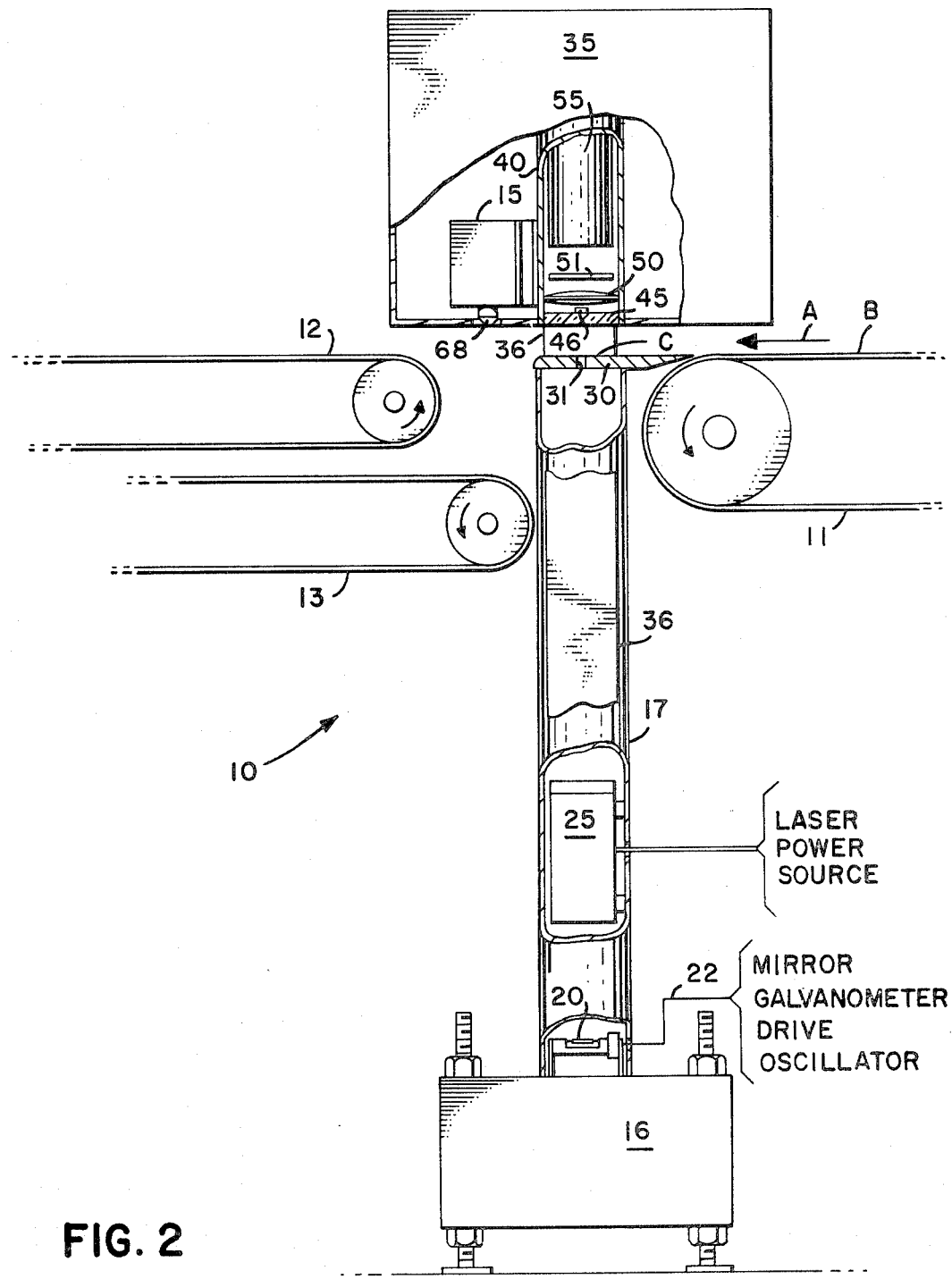
FIG. 2 is a vertical sectional view taken along line 2—2 of FIG. 1 of the apparatus illustrated in FIG. 1.
Figure 3:
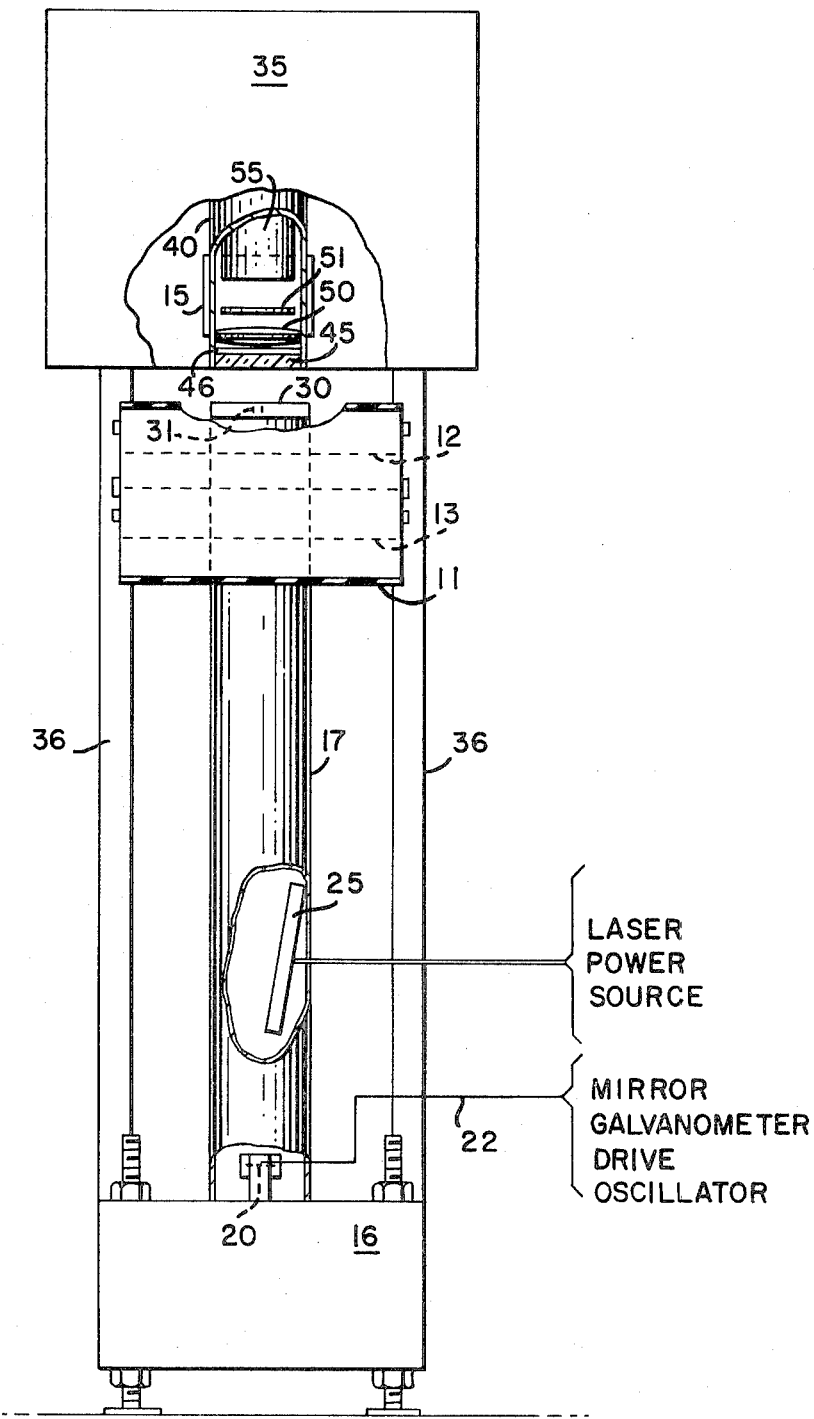
FIG. 3 is a view similar to FIG. 2 taken, however, along a line spaced 90° from the line 2—2 of FIG. 1.

Illustrated in FIGS. 1–5 is the apparatus 10 of the present invention for detecting an opaque object in a translucent substance. It has been known that the flesh of a peach is relatively translucent and diffusive to an impinging light beam and the pit or any portion of the pit has opaque characteristics.

In the typical process of preparing drupes, such as peaches, for canning, the peaches are cut in half and the pits are removed from the peach halves. Before canning, the peach halves are inspected to assure no pit or pit fragment remains in the peach half.

To inspect a comestible, such as a peach half, for the presence of a pit or pit fragment, a suitable delivery conveyor 11 advances continuously in a single file a succession of spaced peach halves, cutside down, in the direction of an arrow A along a predetermined path B. At the discharge end of the conveyor 11 is located an inspection zone C.

A conveyor 12 advances peach halves in which no pit or pit fragment is detected from the inspection zone C and a conveyor 13 advances peach halves in which a pit fragment or pit is detected. The apparatus 10 of the present invention detects the presence or absence of pit fragments as the respective peach halves advance through the inspection zone C. When no pit or pit fragment is detected in a peach half, the peach half leaving the inspection zone C is transferred to and advanced by the conveyor 12. On the other hand, when a pit or a pit fragment is detected in a peach half, the apparatus 10 operates a conventional pneumatic reject valve 15 to release a blast of air under pressure for a sufficient time duration to divert the peach half after leaving the inspection zone C onto the reject conveyor 13.

Illustrated in FIG. 1 is the opaque object detecting apparatus 10 of the present invention which comprises a suitable adjustable base 16 to assure level seating of the detecting apparatus 10 on the supporting surface and at a proper height. An upstanding hollow column 17 is fixed to the base 16.

Mounted in the hollow column 17 above the base 16 is a suitable oscillating mirror. A conventional oscillograph, which is a high-frequency galvanometer, employs such an oscillating mirror. Such an oscillating mirror is also known as a galvanometer mirror. Essentially, the mirror is supported by a movable member or a suspension arm to be oscillated thereby. The axis of the mirror is aligned with the axis of the column 17. In the exemplary embodiment, a suitable mirror galvanometer drive oscillator is connected to the mirror galvanometer 20 (FIG. 2) over a suitable cable 22 to cause the mirror of the mirror galvanometer 20 to oscillate. Such mirrors are capable of oscillating at a rate up to 20,000 cycles per second. However, in the preferred embodiment the mirror galvanometer 20 is excited to oscillate the mirror at an approximate rate of 2,000 cycles per second, the exact rate depending on the light beam diameter and the lineal speed of the substance being scanned.

Disposed within the column 17 above the mirror galvanometer 20 is a suitable laser 25, preferably of the conventional continuous helium neon gas laser. Suitable brackets mount the gas laser 25 in the column 17 so that its axis as well as the axis of the beam of light emitted therefrom is offset from the axis of the column 17 by a suitable angle to enable the gas laser 25 to continuously project a beam of laser light onto the mirror of the galvanometer mirror 20 and enable the mirror of the galvanometer mirror 20 to cast an oscillating beam of laser light along the axis of the column 17.

As shown in FIG. 4, the axis of the mirror of the galvanometer mirror 20 is aligned with the axis of the column 17 and the axis of the output beam of the gas laser 25 is located at an angle of 10° from the axis of the hollow column 17. The scan angle of the oscillating beam of laser light is approximately 5°, and is adjustable through the voltage control of the power source to suit the object being scanned, but in no case is the scan permitted to run off the diffuser.

By virtue of employing a laser beam, a narrow pencil of light is continuously cast on the oscillating mirror. Through this arrangement, the mirror can be relatively small and, therefore, can be oscillated at a high rate. In this manner, the speed of inspection of the peach halves is substantially increased. The oscillating motion of the mirror (rather than rotating) substantially simplifies the supporting equipment. The oscillating mirror is generally of a dimension comparable to the size of the continuous laser beam impinging on it.

At the upper section of the column 17 is disposed an opaque shelf member 30, which has its upper surface at even height with the upper end of the column 17 and the upper runs of the conveyors 11 and 12. In this manner, peach halves, cutside down, are advanced from the conveyor 11 onto the shelf member 30. It is to be observed that the shelf member 30 is located in the inspection zone C.

Formed in the shelf member 30 along the axis thereof is a suitable opening 31. The axis of the shelf member 30 is coincident with the axis of the column 17. Thus, the oscillating pencil of laser light is projected by the mirror of the galvanometer mirror 20 through the opening 31 of the shelf member 30 in the inspection zone C.

Peach halves cutside down advance successively in single file in the direction of the arrow A along the path B from the conveyor 11 onto the shelf member 30 through the inspection zone C. As each peach half advances across the shelf member 30 and as it is above the opening 31, the oscillating pencil of laser light impinges upon and penetrates therethrough. The light so penetrating is diffused by the peach flesh and results in a large glowing area. The flesh of the peach half is translucent, and transmits this glow to the sensor, while any pit or pit fragment therein would be opaque.

Disposed above the hollow housing 17 a suitable distance from the shelf member 30 to permit any size peach half to advance therebetween is a suitable housing 35. Posts 36 support the housing 35 from the base 16. Within the housing 35 is mounted by suitable brackets a member 40. The member 40 has its axis in the upright position and coincident with the axis of the column 17 as well as the opening 31 of the shelf member 30.

Mounted within the member 40 at the lower end thereof and above the inspection zone C is a horizontally disposed clear, transparent, cylindrical quartz window 45 whose function is to protect the fruit. Centrally located within or above the quartz window 45 is a rectangular strip diffuser or diffusing screen 46 that is horizontally disposed and has its axis coincident with the axis of the opening 31 in the shelf member 30, which is also the line of scan. The screen 46 may also be in the form of scattering means to scatter the light. While reference is made to a diffusion screen or a scattering screen, it is to be observed that device 46 is intended as a means for collecting light to conduct it either by reflection, diffusion or dispersion to a photosensor.

When the oscillating pencil of laser light penetrates the peach half advancing over the opening 31 in the inspection zone C, the peach half glows brightly and the light is diffused. During the time interval in which no peach half is disposed over the opening 31 of the shelf member 30, the oscillating pencil of laser light impinges on the diffusion screen 46 which glows brightly and the light is diffused in the manner in which the translucent flesh of the peach half glows and diffuses light. Thus, there is no sharp contrast as peaches enter and leave the inspection zone C, or when the scanning beam runs off the edge of the peach and strikes the diffuser. However, a pit or a pit fragment has opaque characteristics and, when present in a peach half, momentarily intercepts or blocks the entry of the light beam into the peach flesh which sharply reduces the glow and intensity of the light or the light level.

In the member 40 above the quartz window 45 and the diffusion screen 46 may be mounted a suitable lens 50. A suitable filter 51 may also be located in the member 40 above the lens 50. A suitable light detecting device 55 is mounted in the member 40 so as to sense the intensity of light or detect the light level of the oscillating pencil of laser light directed thereto or impinging thereon. The light detecting device 55 may be in the form of a conventional photocell, conventional photomultiplier, a conventional phototube or the like.

Thus, should a peach half, cutside down, advance through the inspection zone C over the opening 31 without a pit or pit fragment thereto, the light detecting device 55 senses the light level from the glow of the translucent peach half and produces a no reject signal in the output thereof. While a peach half does not advance over the opening 31, the diffusing screen 46 directs the oscillating pencil of laser light to the light detecting device 55 at a level of light or intensity so as to cause the output signal from the light detecting device 55 to be a no reject signal. On the other hand, should a pit or a pit fragment be present in the peach half advancing over the opening 31, then the oscillating pencil or laser light is partially or completely blocked or intercepted and the light level is reduced as it impinges on the light detecting device 55. As a consequence thereof, the light detecting device 55 produces a reject signal in the output thereof.

Interconnecting the output of the light detecting device 55 and the reject mechanism 15 is a suitable control circuit 60 (FIG. 5). The control circuit 60 includes a suitable amplifier 61, which serves to increase the amplitude of the output signal from the light sensing device 55. Connected to the output of the amplifier 61 is a suitable comparator circuit 62. The comparator circuit 62 includes a suitable trigger level adjustment circuit 63 for providing a reference level or a comparison signal for the comparator circuit 62.

Should the light sensing device 55 produce in its output a light present signal, then the signal fed to the input side of the comparator circuit 62 is insufficient to produce a trigger pulse in the output of the comparator circuit 62. Conversely, should the light sensing device 55 produce in its output a no light present signal, then the input signal transmitted to the comparator circuit 62 is of a sufficient magnitude to produce a trigger pulse signal in the output of the comparator circuit 62.

A suitable one-shot multivibrator 65 is connected to the output of the comparator circuit 62. When the comparator circuit 62 transmits a trigger pulse to the time delay, one-shot multivibrator circuit 65, the multivibrator circuit 65 changes its state or conducting mode. As a consequence thereof, the time delay, one-shot multivibrator circuit 65 produces a pulse of a predetermined width or time duration. The multivibrator circuit 65 returns to its initial state automatically after a predetermined time duration. During the time duration of the pulse produced in the output of the multivibrator circuit 65, the peach half with the pit fragment therein advances under its own momentum through the inspection zone C to a position below the reject mechanism 15.

Connected to the output of the time delay multivibrator circuit 65 is a suitable one-shot multivibrator circuit 66. When the multivibrator circuit 65 is triggered by the comparator circuit 62, the pulse produced in the output thereof is initiated and the pulse has a predetermined time duration. The termination of the pulse produced in the output of the multivibrator 65 initiates the pulse produced in the output of a one-shot reject solenoid hold multivibrator circuit 66. When a pulse is produced in the output of the multivibrator circuit 66, a reject solenoid 67 in the reject mechanism 15 is energized. The solenoid 67 remains energized during the period of time that the multivibrator circuit 66 produces a pulse in the output thereof. The multivibrator circuit 66 changes its conducting mode by the trigger pulse produced by the multivibrator 65 and the pulse produced thereby is of a sufficient width or time duration to enable the reject mechanism 15 to properly divert the reject peach from its normal path. After the predetermined time interval, the multivibrator circuit 66 automatically returns to its initial state.

While the reject solenoid 67 is energized, a downward blast of air under pressure is cast from a nozzle 68 of the reject mechanism 15 under the control of a solenoid operated valve, not shown. The air blast emitted from the nozzle 68 is of sufficient force to cause the peach half with a pit or pit fragment therein to be diverted onto the reject conveyor 13. The peach half not so diverted will continue on its course to be advanced from the inspection zone C or the acceptable peach conveyor 12.

In the operation of the pit fragment detector of the present invention, peach halves are advanced successively, cutside down, by the conveyor 11 into the inspection zone C. As each peach half advances over the opening 31 of the shelf member 30, an oscillated pencil of laser light penetrates the peach half. The oscillated pencil of laser light is produced by the gas laser 25 which continuously projects onto the oscillating mirror of the mirror galvanometer 20 the continuous beam of laser light. In turn, the mirror of the mirror galvanometer 20 casts an oscillating pencil of laser light through the opening 31 of the shelf member 30 to penetrate the flesh of the peach half advancing over the opening 31 of the shelf member 30.

In the event the peach half advancing over the opening 30 is free of any pit or pit fragment, the flesh of the peach half glows and a light impinges onto the light sensitive device 55 of a sufficient level to cause a no reject signal to be produced in the output of the light sensing device 55. Hence, the output of the comparator circuit 62 does not produce a reject trigger pulse. The peach half so inspected advances through the inspection zone C on its own momentum and is advanced to the next station by the conveyor 12.

As the peach half enters and leaves the inspection zone C, the oscillating pencil of laser light cast by the mirror galvanometer 20 through the opening 31 impinges on the diffusion screen 46 which directs the light onto the light sensing device 55 of sufficient magnitude to cause the light sensing device 55 to produce a no reject signal in the output thereof.

Should the peach half advancing over the opening 31 of the shelf member have a pit fragment therein, then the opaque object partially blocks out or intercepts the light to reduce the level of intensity of the light impinging on the light sensing device 55. As a consequence thereof, a reject signal is produced in the output of the light sensing device 55. This action produces a trigger pulse in the output of the comparator circuit 62.

The trigger pulse from the comparator circuit 62 initiates the change of state of the time delay reject multivibrator circuit 65 to produce in its output a pulse of a predetermined duration. At the completion of the time delay pulse, the peach half to be rejected has advanced below the nozzle 68 of the reject mechanism 15.

At the termination of the reject pulse, the reject solenoid hold multivibrator circuit 66 is activated to produce a pulse in its output of sufficient time duration to enable the reject mechanism 15 through a blast of air under the control of the solenoid 67 of the solenoid operated valve, not shown, ejected from the nozzle 68 to divert the direction of travel of the peach half to be rejected, whereby the rejected peach half is diverted to the reject conveyor 13 for advancement to a reject station.

It is to be observed from the present invention that with the oscillating beam of laser light, pit fragments regardless of location within the cavity are detected. With a conventional light source, pit fragments not precisely in the path of the focused beam did not fully intercept the focused beam of light. With the laser beam of light, the diameter thereof is so small that the pit fragment to flesh change is very pronounced, since the light is fully intercepted by any significant fragment.

With the smaller mirror that is now possible through the use of laser light, the mirror can be oscillated. The mirror employed with a conventional source of light was rotated, but not oscillated. The rotating mirror causes the scanning spot to go off the field of view and, therefore, the electronic circuitry requires gating.

In the apparatus of the present invention, the intense laser spot does not fall directly on the face of the photosensor to cause rapid fatigue on the photosensor, but, rather, the peach half diffuses the light impinging on the photosensor. In the absence of the peach half, the light through a collecting device is conducted toward the photosensor by diffusion, scattering, dispersion or reflection.

Although the best mode contemplated for carrying out the present invention has been herein shown and described, it will be apparent that modification and variation may be made without departing from what is regarded to be the subject matter of the invention as set forth in the appended claims.

Having completed a detailed description of the invention so that one skilled in the art could practice the same, I claim:

1. Apparatus for detecting an opaque object in translucent fruit comprising means for projecting a narrow pencil of light, an oscillating mirror disposed in the path of the projected pencil of light for scanning the fruit with said oscillating pencil of light reflected toward the translucent fruit, and a light detecting device disposed in the path of the light diffused through the translucent fruit and responsive to changes in the diffused light for producing an electrical signal when the oscillating pencil of light strikes the opaque object.

2. Apparatus for detecting an opaque object in a translucent substance as claimed in claim 1 wherein said source of light is a laser.

3. Apparatus for detecting objects in fruit comprising a conveyor for advancing fruit into an inspection zone, means for casting a beam of light toward the fruit in the inspection zone, a light detecting device disposed in the path of the light diffused through the fruit and responsive to the light intensity of the diffused light for producing an output signal in accordance with the presence or absence of an object in the fruit, and diffusing means disposed between said beam of light and said detecting device to diffuse the beam of light in the absence of said translucent substance.

4. Apparatus for detecting objects in fruit as claimed in claim 3 wherein said beam of light is narrow and said means for casting said beam of light includes an oscillating mirror for casting an oscillating pencil of light toward the fruit.

5. Apparatus for detecting objects in fruit as claimed in claim 4 in which said means for casting an oscillating pencil of light comprises a source of laser light that projects a beam of laser light on said oscillating mirror and said oscillating mirror casts the oscillating beam of laser light toward the fruit.

6. Apparatus for detecting objects in fruit as claimed in claim 5 wherein said source of light is a gas laser.

7. Apparatus for detecting opaque pit fragments in pitted fruit halves comprising a fruit conveyor for advancing successively fruit halves cutside down to an inspection zone, a second conveyor for advancing fruit halves from the inspection zone, means for scanning the fruit half in the inspection zone with a pencil of light, a light detecting device disposed in the path of the light diffused through the fruit half and responsive to the light intensity of the diffused light for producing an output signal in accordance with the presence or absence of a pit fragment in the fruit half, a pit fragment being an opaque object and capable of intercepting light, and a rejection mechanism disposed adjacent said inspection zone and operative to divert the fruit half from said second conveyor in response to said light detecting device producing a signal representative of a fruit half to be diverted.

8. Apparatus for detecting pit fragments in open-pitted fruit halves as claimed in claim 7 wherein said means for scanning with a pencil of light includes a laser and an oscillating mirror for casting an oscillating pencil of light toward the fruit half.

9. Apparatus for detecting pit fragments in open-pitted fruit halves as claimed in claim 8, and comprising means disposed in the path of the oscillating pencil of laser light between said mirror and said light detecting device to scatter the oscillating pencil of laser light directed toward said light detecting device during the absence of a fruit half in the inspection zone.

10. Apparatus for detecting an opaque object in a translucent substance comprising a source of light for projecting a beam of light, an oscillating mirror disposed in the path of the projected beam of light for casting an oscillating beam of light toward the translucent substance, a light detecting device disposed in the path of the light diffused through the translucent substance and responsive to the diffused light for producing an electrical signal, and diffusing means disposed in the path of the oscillating beam of light cast by the oscillating mirror to diffuse the same in the absence of the translucent substance.

11. Apparatus for detecting an opaque object in a translucent substance comprising a gas laser for projecting continuously a pencil of laser light, an oscillating mirror disposed in the path of the projected pencil of light for casting an oscillating pencil of light toward the translucent substance, a light detecting device disposed in the path of the light diffused through the translucent substance and responsive to the diffused light for producing an electrical signal, and diffusing means disposed in the path of the oscillating pencil of laser light cast by the oscillating mirror to diffuse the same in the absence of the translucent substance.

12. Apparatus for detecting objects in fruit comprising a conveyor for advancing fruit into an inspection zone, means for casting an oscillating beam of light toward the fruit in the inspection zone, and a light detecting device disposed in the path of the light diffused through the fruit and responsive to the light intensity of the diffused light for producing an output signal in accordance with the presence or absence of an object in the fruit, an object in the fruit affects the light diffused through the fruit, and diffusing means disposed in the path of the oscillating beam of light to conduct the beam of light toward said light detecting device in the absence of a fruit in the inspection zone.

13. Apparatus for detecting objects in fruit comprising a conveyor for advancing fruit into an inspection zone, means for casting an oscillating beam of light toward the fruit in the inspection zone, said means including an oscillating mirror, said means comprising a source of laser light that projects a pencil of laser light on said oscillating mirror which casts the oscillating pencil of laser light toward the fruit, a member in said inspection zone over which the fruit advances, said member being formed with an opening through which said pencil of laser light oscillated by said oscillating mirror is cast in penetrating the fruit advancing over said opening, and diffusing means disposed in the path of the oscillating pencil of laser light between said opening in said member and said light detecting device to conduct the oscillating pencil of laser light toward said light detecting device during the absence of a fruit in the inspection zone.

14. Apparatus for detecting pit fragments in open-pitted fruit halves comprising a fruit conveyor for advancing successively fruit halves cutside down to an inspection zone, a second conveyor for advancing fruit halves from the inspection zone, means for casting an oscillating beam of light including an oscillating mirror for casting the oscillating beam of light toward the fruit half in the inspection zone, said means comprising a source of laser light that projects a continuous pencil of laser light on said oscillating mirror and said oscillating mirror casts the oscillating pencil of laser light toward the fruit half, a member in said inspection zone over which the fruit half advances, said member being formed with an opening through which said pencil of laser light oscillated by said oscillating mirror is cast in penetrating the fruit half advancing over said opening, a light detecting device disposed in the path of the light diffused through the fruit half and responsive to the light intensity of the diffused light for producing an output signal in accordance with the presence or absence of a pit fragment in the fruit half, a pit fragment being an opaque object and capable of intercepting light, means disposed in the path of the oscillating pencil of laser light between said opening in said member and said light detecting device to scatter the oscillating pencil of laser light impinging on said light detecting device during the absence of a fruit half in the inspection zone, and a rejection mechanism disposed adjacent said inspection zone and operative to divert the fruit half from said second conveyor in response to said light detecting device producing a signal representative of a fruit half to be diverted.

15. A method of detecting a pit fragment is a drupe half comprising the steps of, advancing the drupe half along a predetermined path, casting on said drupe half an oscillating beam of laser light, and diffusing the oscillating beam of laser light in the absence of a drupe half.

16. A method of detecting a pit fragment in a drupe half comprising the steps of, advancing the drupe half along a predetermined path, casting on said drupe half an oscillating beam of laser light, and scattering the oscillating beam of laser light in the absence of a drupe half.

17. Apparatus for detecting an opaque object in a moving translucent comestible comprising, means to project a pencil of light of smaller span than the comestible, means to move said pencil of light repeatedly across the moving comestible to diffuse light through said comestible when the pencil of light is not interrupted by an opaque object, and a light detecting device disposed in the path of light diffused through the translucent comestible and responsive to change in light intensity to produce a signal when the pencil of light strikes an opaque object to reduce the diffusion of light through the comestible.

18. Apparatus for detecting pit fragments in pitted fruit halves comprising a fruit conveyor for advancing successively fruit halves cutside down to an inspection zone, a second conveyor for advancing fruit halves from the inspection zone, means for casting an oscillating beam of light toward the fruit half in the inspection zone, said means including an oscillating mirror and a source of laser light that projects a continuous pencil of laser light on said oscillating mirror which casts the oscillating pencil of light toward the fruit half, a member in said inspection zone over which the fruit half advances, said member being formed with an opening through which said pencil of laser light oscillated by said oscillating mirror is cast in penetrating the fruit half advancing over said opening, a light detecting device disposed in the path of the light diffused through the fruit half and responsive to the light intensity of the diffused light for producing an output signal in accordance with the presence or absence of a pit fragment in the fruit half, a pit fragment being an opaque object and capable of intercepting light, and a rejection mechanism disposed adjacent said inspection zone and operative to divert the fruit half from said second conveyor in response to said light detecting device producing a signal representative of a fruit half to be diverted.

19. The method of detecting an opaque object in a moving translucent comestible comprising projecting a pencil of light of smaller span than the comestible, moving said pencil of light repeatedly across the moving comestible to diffuse light through said comestible when the pencil of light is not interrupted by an opaque object, and sensing the light diffused through said object to detect a reduction of said light.

* * * * *